United States Patent
Plouraboue et al.

(10) Patent No.: US 7,305,813 B2
(45) Date of Patent: Dec. 11, 2007

(54) LAWN MOWER

(75) Inventors: Tommy Plouraboue, Ormes—Loire (FR); Dominique Vougier, Ormes—Loire (FR); Cyril Perotin, Ormes—Loire (FR); Patrick Templier, Ormes—Loire (FR)

(73) Assignee: Honda Motor Co., Ltd. (JP)

( * ) Notice: Subject to any disclaimer, the term of this patent is extended or adjusted under 35 U.S.C. 154(b) by 157 days.

(21) Appl. No.: 11/193,838

(22) Filed: Jul. 29, 2005

(65) Prior Publication Data

US 2006/0042218 A1    Mar. 2, 2006

(30) Foreign Application Priority Data

Sep. 2, 2004 (JP) ............................ 2004-255833

(51) Int. Cl.
*A01D 67/00* (2006.01)

(52) U.S. Cl. ..................................... 56/320.2

(58) Field of Classification Search ............... 56/320.2, 56/295, DIG. 20, 255, 320.1, 17.5
See application file for complete search history.

(56) References Cited

U.S. PATENT DOCUMENTS 5,267,429 A * 12/1993 Kettler et al. ................. 56/295
5,488,821 A * 2/1996 McCunn et al. ........... 56/320.2
5,628,171 A * 5/1997 Stewart et al. ............. 56/320.2
6,189,307 B1 * 2/2001 Buss et al. ................. 56/320.1
6,470,663 B2 * 10/2002 Langworthy et al. ...... 56/320.2
2004/0237492 A1 * 12/2004 Samejima et al. ......... 56/320.1

FOREIGN PATENT DOCUMENTS

JP          63 61223          4/1988

* cited by examiner

*Primary Examiner*—Árpád Fábián Kovács
(74) *Attorney, Agent, or Firm*—Adam & Wilks

(57) ABSTRACT

A lawn mower having a cutter housing for receiving a cutter blade for cutting grass. To make the manufacture of molds easy, the cutter housing is divided into three members: a housing proper for receiving the cutter blade, a bottom member for forming a cut grass carrying passage, and a scroll guide member for forming a portion of a scroll part. The bottom member engages with the housing proper and the scroll guide member. The scroll guide member is co-fastened to the housing proper with an engine. As a result, molds needed for making the cutter housing can be made simple and the assembly of the lawn mower made easy.

12 Claims, 12 Drawing Sheets

LAWN MOWER

FIELD OF THE INVENTION

This invention relates to a lawn mower, and particularly to an improved cutter housing.

BACKGROUND OF THE INVENTION

Lawn mowers in which a cutter blade is rotatably mounted in a cutter housing and grass cuttings are discharged to outside the cutter housing from a scroll part of the cutter housing through a cut grass carrying passage are known. In a lawn mower of this kind, the scroll part and the cut grass carrying passage are formed integrally with the cutter housing.

A lawn mower in which a scroll part is formed integrally with a cutter housing like this and a bottom part of a cut grass carrying passage is formed separately is proposed in for example JP-UM-A-63-61223. This lawn mower will now be described on the basis of FIG. 11 and FIG. 12.

The lawn mower 220 shown in FIG. 11 has an engine 222 mounted on top of a cutter housing 221 and a cutter blade 224 attached to the output shaft 223 of this engine 222, and the cutter blade 224 is rotated inside the cutter housing 221 to cut grass.

As shown in FIG. 12, the cutter housing 221 has a scroll part 225 which allows rotation of the cutter blade 224 and in which grass cuttings cut by the cutter blade 224 swirl, and a cut grass carrying duct 226 through which the grass cuttings are carried from the scroll part 225 to outside the cutter housing 221.

The cut grass carrying duct 226 is made up of an approximately U-shaped cut grass passage part 227 formed integrally with the cutter housing 221, and a bottom plate 228 formed as a separate part covering the cut grass passage part 227.

However, in the lawn mower 220 of the related art described above, because only the bottom plate 228 has been made a separate component from the cutter housing 221, there has been the shortcoming that this is not enough to make the shape of the cutter housing 221 simple, and it is not possible to simplify the mold.

Also, in this lawn mower 220, because the cut grass passage part 227 and the scroll part 225 of the cut grass carrying duct 226 are formed integrally with the cutter housing 221 and the bottom plate 228 of the cut grass carrying duct 226 is formed as a separate piece, it is necessary for mounting parts 229 to be formed in three locations on the bottom plate 228. Consequently, there has been the problem that the number of fixing components such as screws increases and ease of assembly deteriorates.

Accordingly, a lawn mower has been awaited with which it is possible to form the cutter housing easily by split construction and it is possible to achieve improved ease of assembly of the pieces of the split construction and to achieve improved productivity.

SUMMARY OF THE INVENTION

The invention provides a lawn mower having a motive power source; a cutter blade for cutting grass; and a cutter housing that receives the cutter blade and has a scroll part for guiding cut grass into a cut grass carrying passage, wherein the cutter housing is divided into a housing proper for receiving the cutter blade, a bottom member to be attached to the housing proper and form the cut grass carrying passage, and a scroll guide member to be attached to the housing proper and form the scroll part, a cut grass carrying passage exit side of the bottom member is engaged with the housing proper, a cut grass carrying passage entrance side of the bottom member is attached to the housing proper and engages with the scroll guide member, and the scroll guide member is co-fastened with the motive power source inside the housing proper.

Because in this invention the cutter housing is divided into three members, simplification of dies for molding the members constituting the cutter housing is achieved and the manufacturability of the cutter housing can be improved.

However, in the lawn mower 220 of related art described above, because only the bottom plate 228 has been made a separate component from the cutter housing 221, there has been the shortcoming that this is not enough to make the shape of the cutter housing 221 simple, and it is not possible to simplify the mold.

Also, because the cut grass carrying passage exit side of the bottom member is engaged with the housing proper and the cut grass carrying passage entrance side is attached to the housing proper and also engaged with the scroll guide member, the ease of assembly of the bottom member and the scroll guide member to the housing proper improves.

Furthermore, because the scroll guide member is co-fastened to the motive power source and the housing proper, notwithstanding the increase in the number of parts arising from the division of the cutter housing into a plurality of members, there is no increase in the number of fixing screws.

BRIEF DESCRIPTION OF THE DRAWINGS

A preferred embodiment of the invention will be described below in detail on the basis of the accompanying drawings, in which.

DETAILED DESCRIPTION OF THE INVENTION

Figure 1:
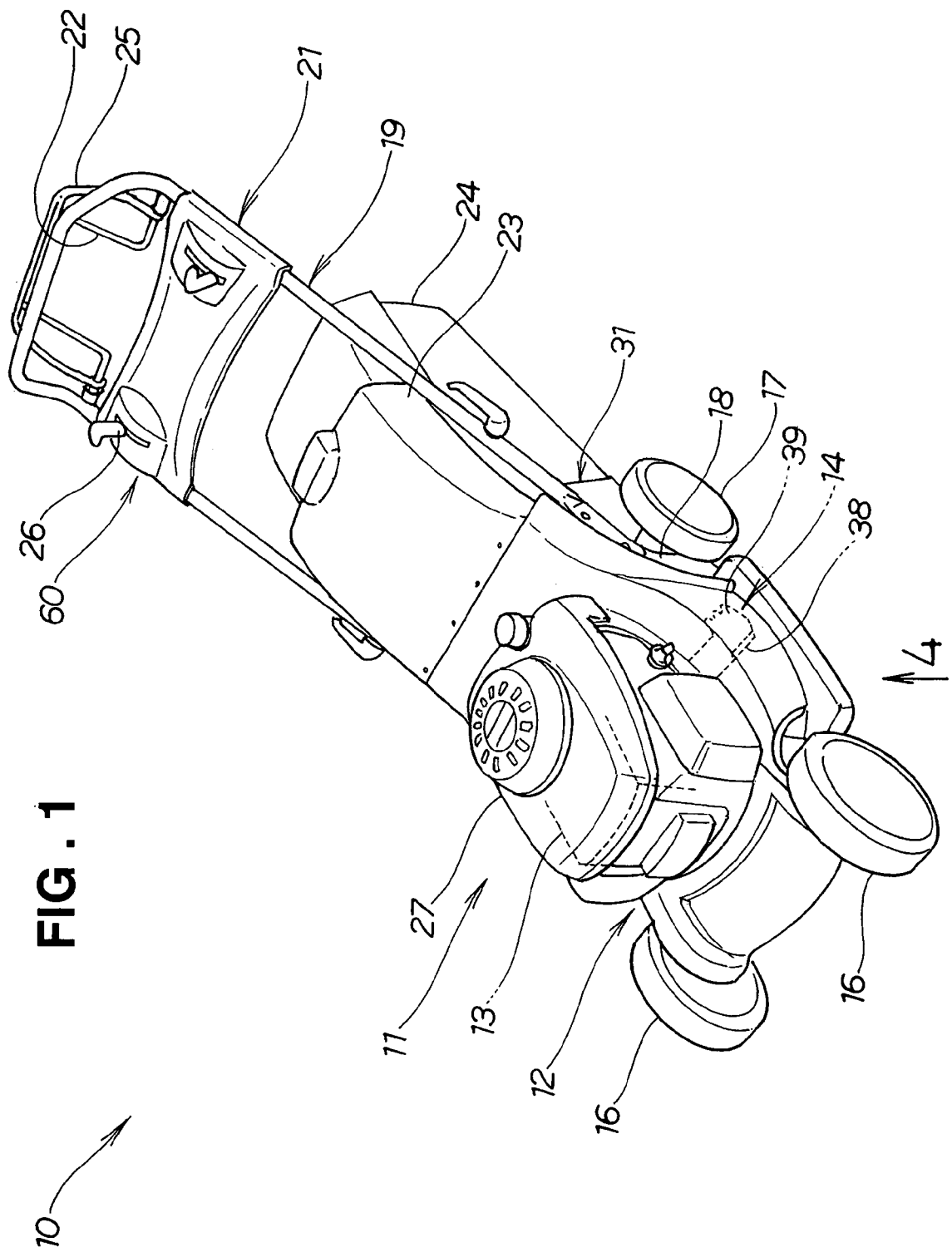
FIG. 1 is a perspective view of a lawn mower according to the invention.

A lawn mower 10 constituting a preferred embodiment of the invention shown in FIG. 1 is of a self-propelling type. A cutter blade 14 for cutting grass is rotated by an engine 13, which is a motive power source. Cut grass is collected by being carried from a cutter housing 12 by a carrying draft into a grass bag 24. Rear wheels 17 are driven by the engine 13.

In the figure, the reference number 11 denotes a machine body; 16 front wheels; 18 handle stays; 19 a handle; 21 a handle cover extending across the handle 19; 22 a clutch lever for travel, which clutch-controls motive power transmission from the engine 13 to the rear wheels 17; 23 a grass cover; 25 a clutch lever for clutch-controlling rotational power to the cutter blade 14; 26 a lock lever; 27 a head cover; and 60 a lock mechanism.

The clutch lever 25 is a lever that simultaneously performs an operation of applying a brake to the cutter blade 14 while stopping the driving of the cutter blade 14, and is sometimes called a BBC control lever because it controls a blade, a brake and a clutch.

Figure 2:
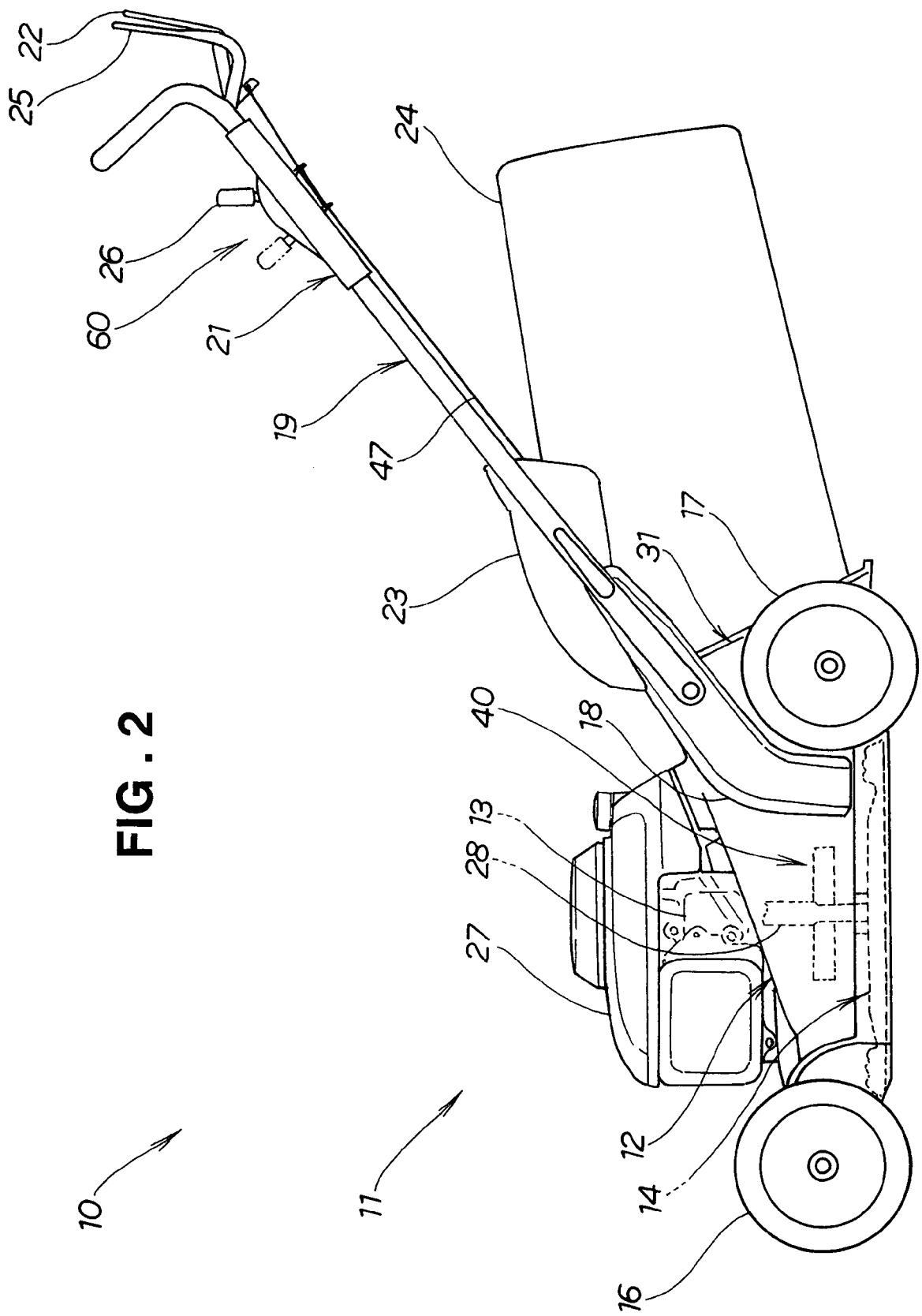
FIG. 2 is a side view of the lawn mower shown in FIG. 1.

As shown in FIG. 2, the engine 13 of the lawn mower 10 is mounted on the top of the cutter housing 12. The cutter blade 14 is attached to the output shaft 28 of the engine 13 by way of a clutch mechanism 40. The left and right front wheels 16 are disposed at side faces of the front part of the cutter housing 12, and the left and right rear wheels 17 are disposed at side faces of the rear part of the cutter housing 12. Left and right handle stays 18 are attached to the side faces of the rear part of the cutter housing 12. The handle 19 extends rearward from the rear parts of these handle stays 18, 18. The clutch lever 25 is mounted on this handle 19 and controls the clutch mechanism 40. The lock lever 26 is mounted in front of the clutch lever 25 and bars an engaging function of the clutch lever. The grass bag 24 is removably attached to a rear wall 31 of the cutter housing 12. A grass guard 23 is swingably attached to an upper part of the rear wall 31 of the cutter housing 12.

The grass bag 24 is made of a porous material having air holes (not shown) through which the carrying draft can pass but grass cuttings cannot pass.

Figure 3:
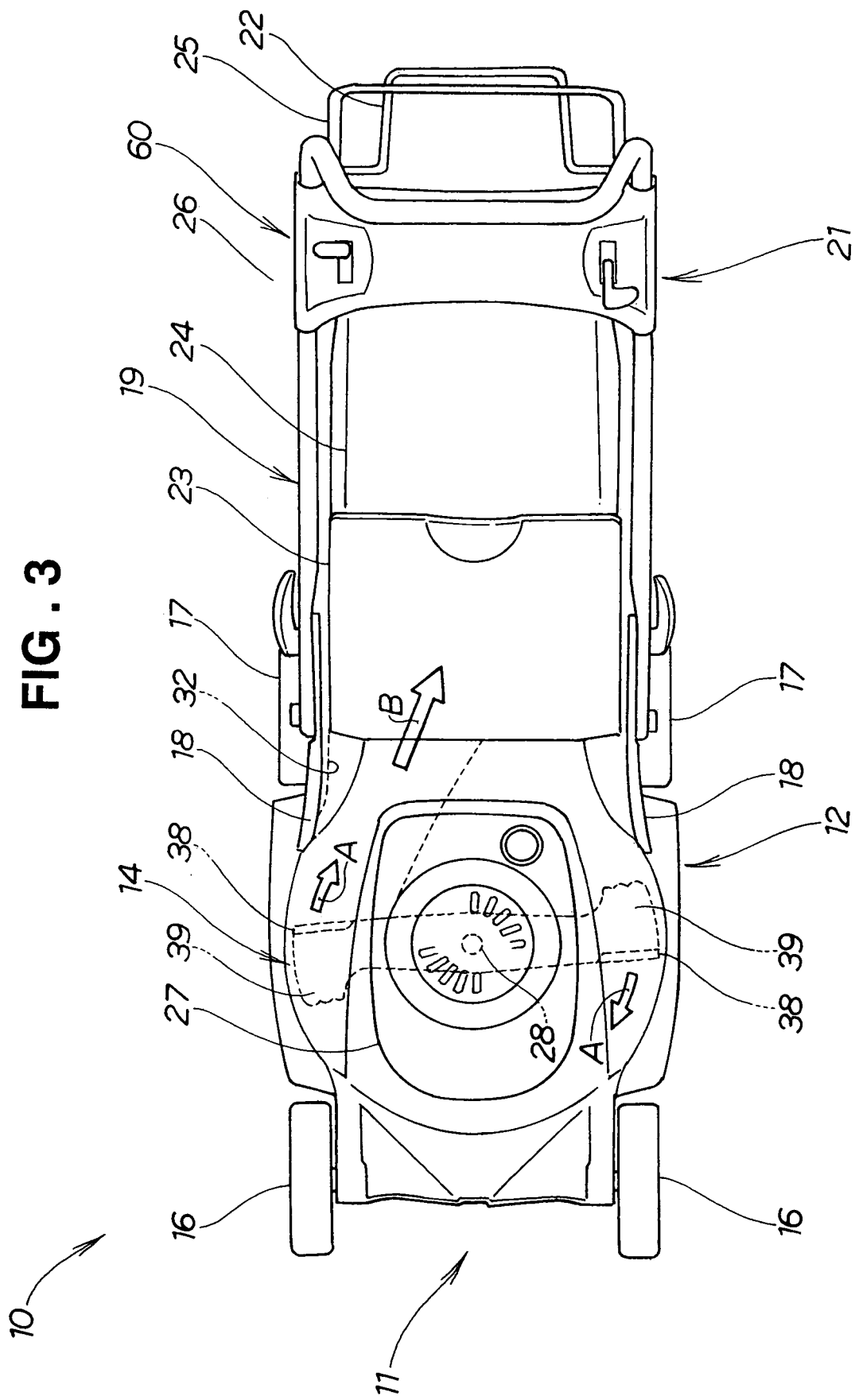
FIG. 3 is a plan view of the lawn mower shown in FIG. 1.

As shown in FIG. 3, with the engine 13 (see FIG. 2) started, the clutch mechanism 40 (see FIG. 2) is switched from an off state to an engaged state by a two-stage motion of shifting the clutch lever 25 to the handle 19 side and then shifting the lock lever 26 forward, to rotate the cutter blade 14, and the clutch lever for travel 22 is shifted to the handle 19 side to rotate the rear wheels 17, 17.

The cutter blade 14 has blade parts 38, 38 on its leading sides in the rotation direction shown with the arrows A, A, and from these blade parts 38, 38 on its trailing sides in the rotation direction it has air-lifting parts 39, 39 formed so as to curve upward.

That is, as the cutter blade 14 rotates, grass on the ground surface is caused to stand up by a negative pressure arising on the undersides of the air-lifting parts 39, 39, and the grass is cut by the blade parts 38, 38. The cut grass is hit by the upper sides of the air-lifting parts 39, 39 and caught by a swirling airflow created by the rotation of the cutter blade 14, and with this swirling airflow as a carrying draft the grass cuttings are fed together with the carrying draft through a cut grass carrying passage 32 into the grass bag 24 as shown by the arrow B.

Figure 4:
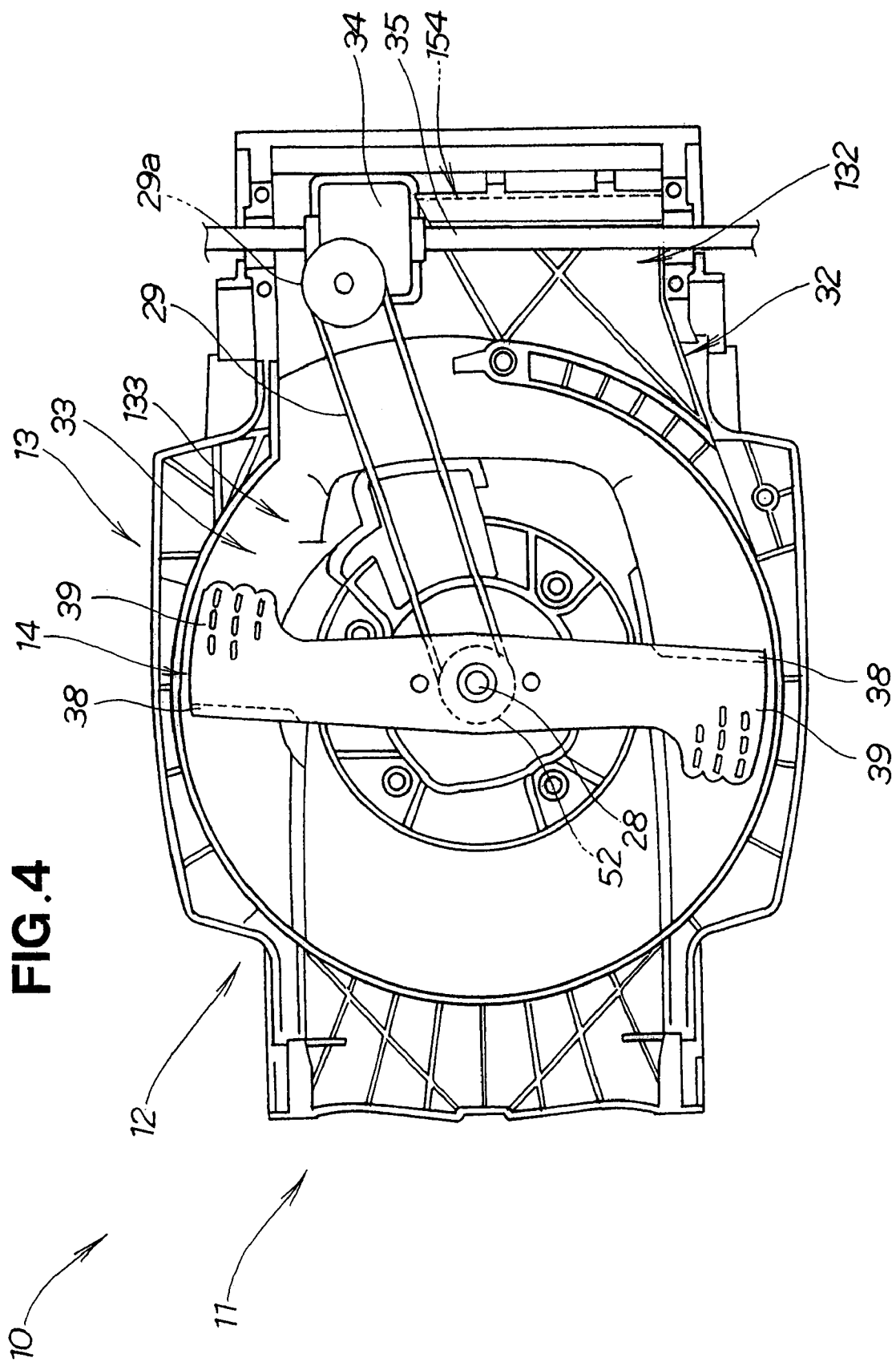
FIG. 4 is a view in the direction of the arrow 4 in FIG. 1.

FIG. 4 shows the underside of the lawn mower 10.

The cutter blade 14 is covered by the cutter housing 12. The cut grass carrying passage 32 for guiding cut grass into the grass bag 24 (see FIG. 2) is formed in the cutter housing 12. This cut grass carrying passage 32 connects with the grass bag 24.

The reference number 29 denotes a power-transmitting part (a belt); 33 a scroll part provided in the cutter housing 12 for rotatably receiving the cutter blade 14; 52 a drive pulley; 34 a clutch for travel; and 35 a rear wheel axle.

In the lawn mower 10, the output of the engine 13 is transmitted from the drive pulley 52 of the output shaft 28 to a driven pulley 29a by the belt 29, and by way of the driven pulley 29a and the clutch for travel 34 the output of the engine 13 is transmitted to the rear wheel axle 35 and drives the rear wheels 17, 17 (see FIG. 3).

Figure 5:
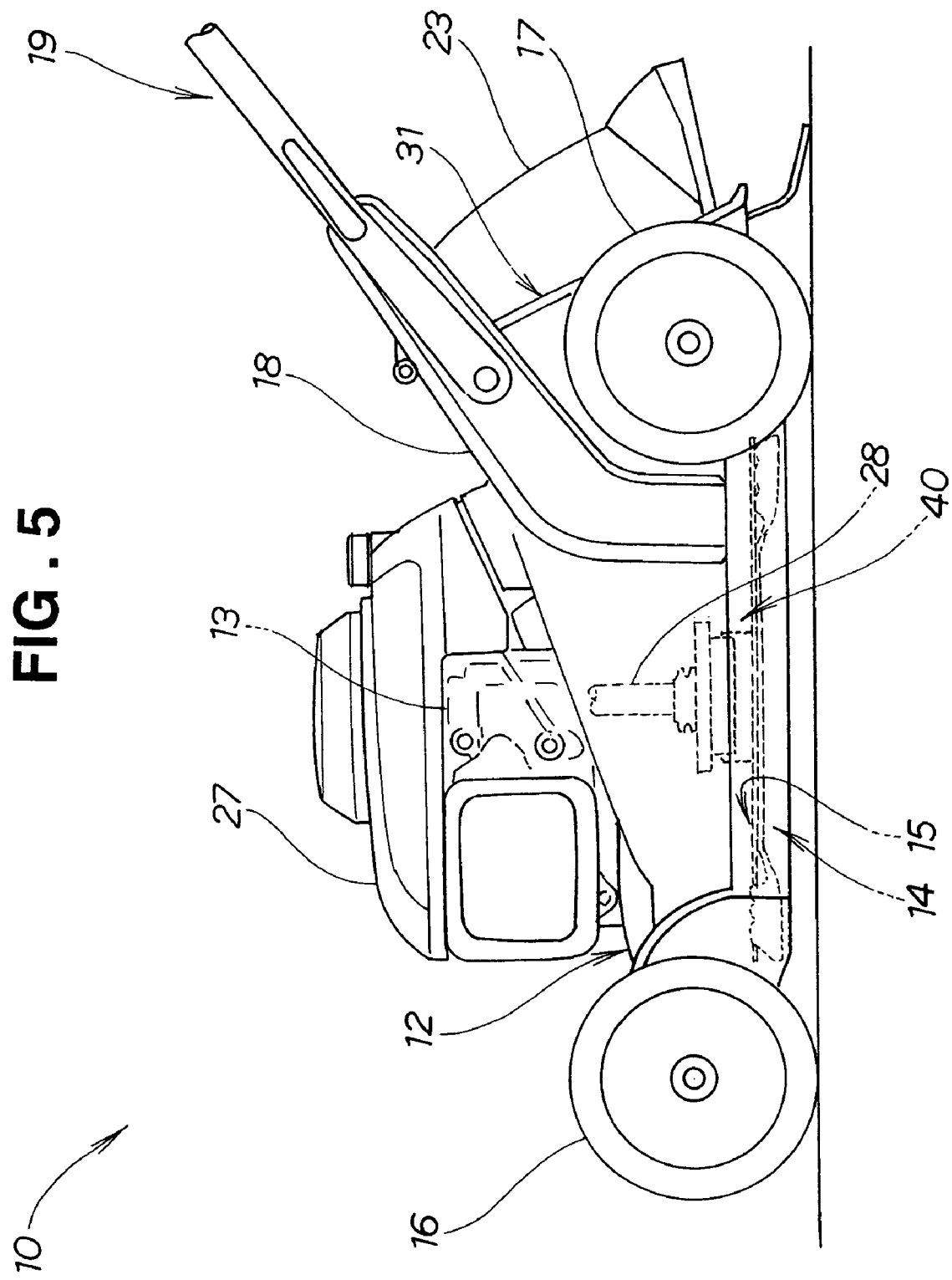
FIG. 5 is a view showing a mulching work state of the lawn mower shown in FIG. 2.

FIG. 5 shows a mulching work state of the lawn mower. Mulching work (mulching mode) is a working mode in which two cutter blades are provided in the cutter housing, grass is cut with these cutter blades, and finely cut grass cuttings are dispersed on the lawn surface (ground surface) so that they are inconspicuous. Mulching work is an alternative mode of discharge work, discussed below.

Discharge work (discharge mode) is a working mode in which grass is cut with one cutter blade, and the cut grass is made to pass through the cut grass carrying passage and discharged to outside through the grass cover.

Bagging work (bagging mode) is a working mode in which grass is cut with one cutter blade and the cut grass is made to pass through the cut grass carrying passage and collected in the grass bag.

That is, the lawn mower 10 of this preferred embodiment is capable of mulching work, discharge work and bagging work (see FIG. 2). When mulching work is to be done, an upper cutter blade 15 for mulching work is fitted to the output shaft 28 of the engine 13 along with a cutter blade 14 for discharge work and bagging work, and a closing member (not shown) is placed in the cut grass carrying passage 32 (see FIG. 4).

Figure 6:
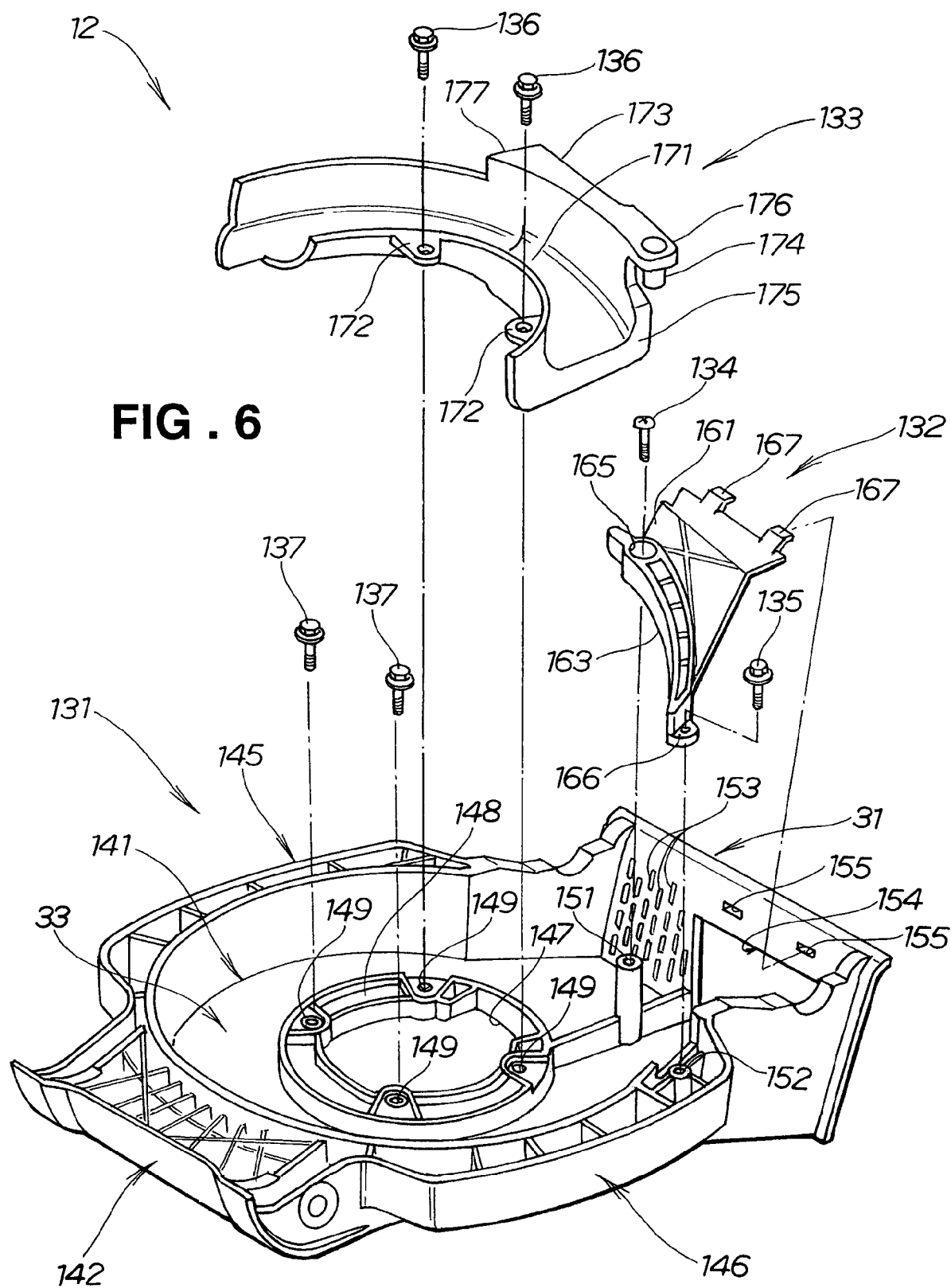
FIG. 6 is an exploded perspective view of a cutter housing according to the invention.
Figure 7:
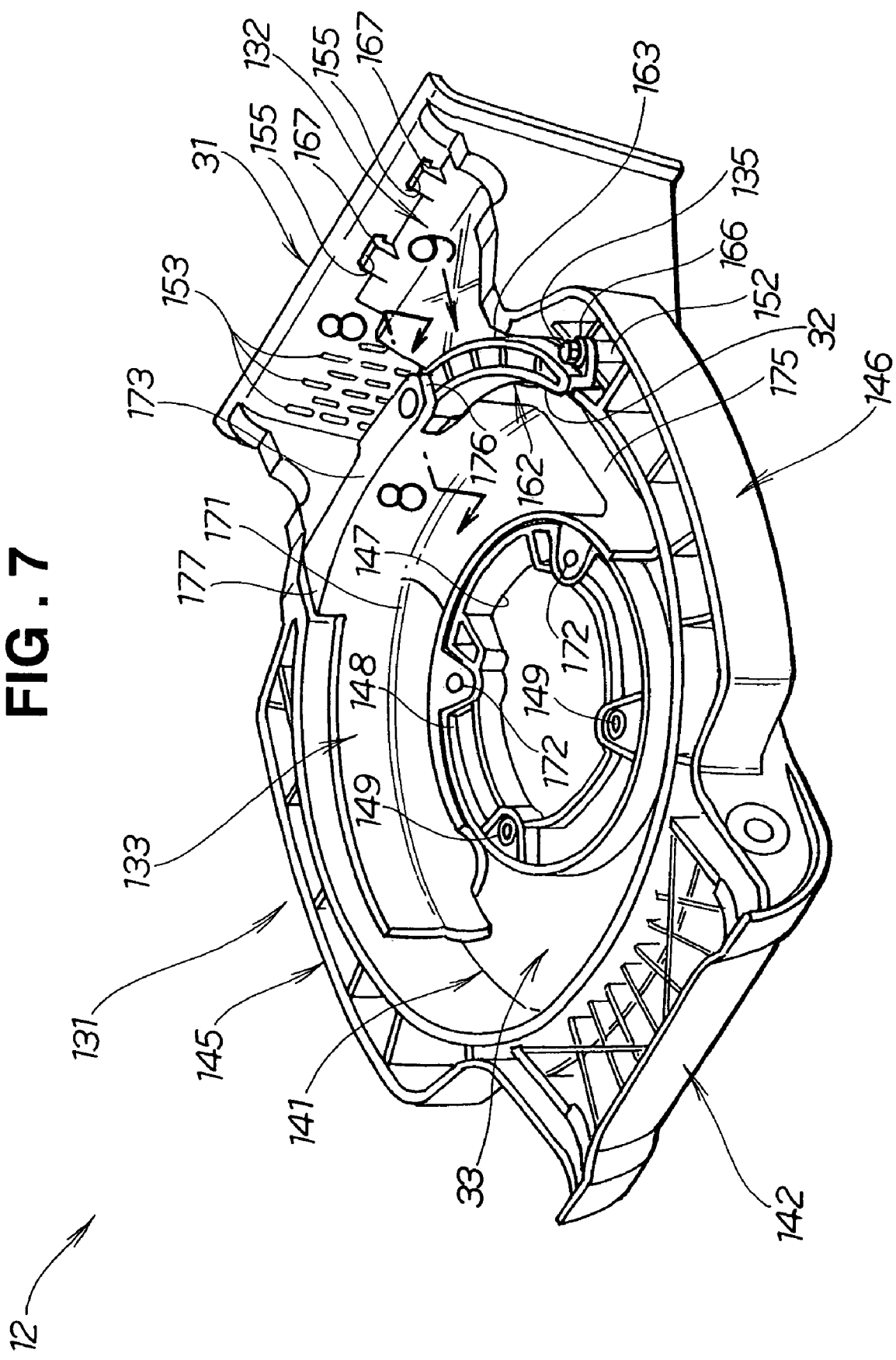
FIG. 7 is a perspective view showing the cutter housing shown in FIG. 6 in its assembled state.

FIG. 6 and FIG. 7 show a cutter housing 12 according to the invention in an upside-down state.

The cutter housing 12 is made up of a housing proper 131 for receiving the cutter blade 14; a bottom member 132, attached to this housing proper 131, for forming the cut grass carrying passage 32 (see FIG. 4); and a scroll guide member 133, attached to the housing proper 131, for forming the scroll part 33 (see FIG. 4). This cutter housing 12 is made of a resin material.

The bottom member 132 is attached to the housing proper 131 by fasteners such as fixing screws 134, 135. The scroll guide member 133 is co-fastened to the cutter housing 12 and the engine 13 (see FIG. 1) with fasteners such as fixing screws 136, 136.

The reference numbers 137, 137 denote fasteners in the form of fixing screws for fixing the engine 13 to the cutter housing 12.

The housing proper or housing main body 131 has a top wall and an arcuate inner sidewall that jointly define a housing concavity 141 (FIG. 6) forming the cut grass carrying passage 32 and the scroll part 33 shown in FIG. 4. A front guard part 142 is formed at the front of this housing concavity 141. A rear wall 31 is formed at the rear of the housing concavity 141. Left and right side guard parts 145, 146 are formed at the left and right sides of the housing concavity 141.

The output shaft 28 of the engine 13 and the dutch mechanism 40 shown in FIG. 2 are passed through a top opening 147 formed in the center of the housing concavity 141.

An engine mount part 148 for the engine 13 to be mounted to is formed around the top opening 147. The engine 13 is mounted to the engine mount part 148 using the fixing screws 136, 137 and a plurality of fixing holes 149 formed in the engine mount part 148.

An inner mounting boss 151 for mounting the bottom member 132 to the housing proper 131 is formed in the housing concavity 141. Also, an outer mounting boss 152 for mounting the bottom member 132 to the housing proper 131 is formed on the right side guard part 146.

Multiple internal pressure control holes 153 for controlling the internal pressure of the cut grass collecting unit 24 (see FIG. 2) are formed in the left side of the rear wall 31. A cut grass carrying passage exit 154 (exit-side opening) is formed in the right side of the rear wall 31. Engaging holes 155, 155 for engaging with the bottom member 132 are also formed in the right side of the rear wall 31.

The bottom member 132 has a body part 161 for forming the bottom of the cut grass carrying passage 32 (see FIG. 4); an entrance-side reinforced part 163 formed in the front of the body part 161 so that it forms a flange in the shape of an arc of the circle of the scroll part 33 (see FIG. 4) and completes a cut grass carrying passage entrance 162 (see FIG. 7); an inner mounting part 165, formed at the inner end of this entrance-side reinforced part 163, to be fixed to the inner mounting boss 151; an outer mounting part 166, formed at the outer end of the entrance-side reinforced part 163, to be fixed to the outer mounting boss 152; and projections 167, 167, formed at the rear of the body part 161, to fit in the engaging holes 155, 155 formed in the rear wall 31.

The entrance-side reinforced part 163 has the function of completing the vertical wall of the scroll part 33.

The scroll guide member 133 has an arcuate scroll channel 171 through which an approximate sectional U-shape forming the scroll part 33 (see FIG. 4) continues. The scroll guide member 133 is co-fastened to the housing proper 131 along with the engine 13 through co-fastening parts 172, 172 formed at the inner periphery of this scroll channel 171. A flange part 173 formed on the outer periphery of the scroll channel 171 forms an arcuate flange of the scroll part 33. The flange part 173 has a protuberance or boss part 174 formed at one end 176 of it. The boss part 174 is fitted (press-fitted) in an opening in the inner mounting part 165 of the bottom member 132. A carrying passage side face part 175 forming a part of a side face of the cut grass carrying passage 32 is formed at the end 176 of the scroll channel 171.

The reference number 177 denotes the other end of the flange part 173.

Also, to obtain the ideal (desired) shape of the scroll part 33, the scroll guide member 133 is positioned at the lowest position of the cut grass carrying passage entrance 162 of the cut grass carrying passage 32 and is formed-in a shape continuous with the housing proper 131 at the vicinity of the maximum width of the cutter housing 12.

Because the cutter housing 12 is divided into the housing proper 131, the bottom member 132 and the scroll guide member 133 like this, simplification of dies for molding the members constituting the cutter housing 12 is achieved and the manufacturability of the cutter housing 12 can be improved.

Because the projections 167, 167 formed on the bottom member 132 are engaged with the engaging holes 155, 155 formed in the rear wall 31 of the housing proper 131, the ease of assembly of the bottom member 132 to the housing proper 131 is improved.

And because the scroll guide member 133 is co-fastened to the engine 13 and the housing proper 131, notwithstanding the increase in the number of parts arising from the division of the cutter housing 12 into a plurality of members, as mentioned above, there is no increase in the number of fixing screws.

Figure 8:
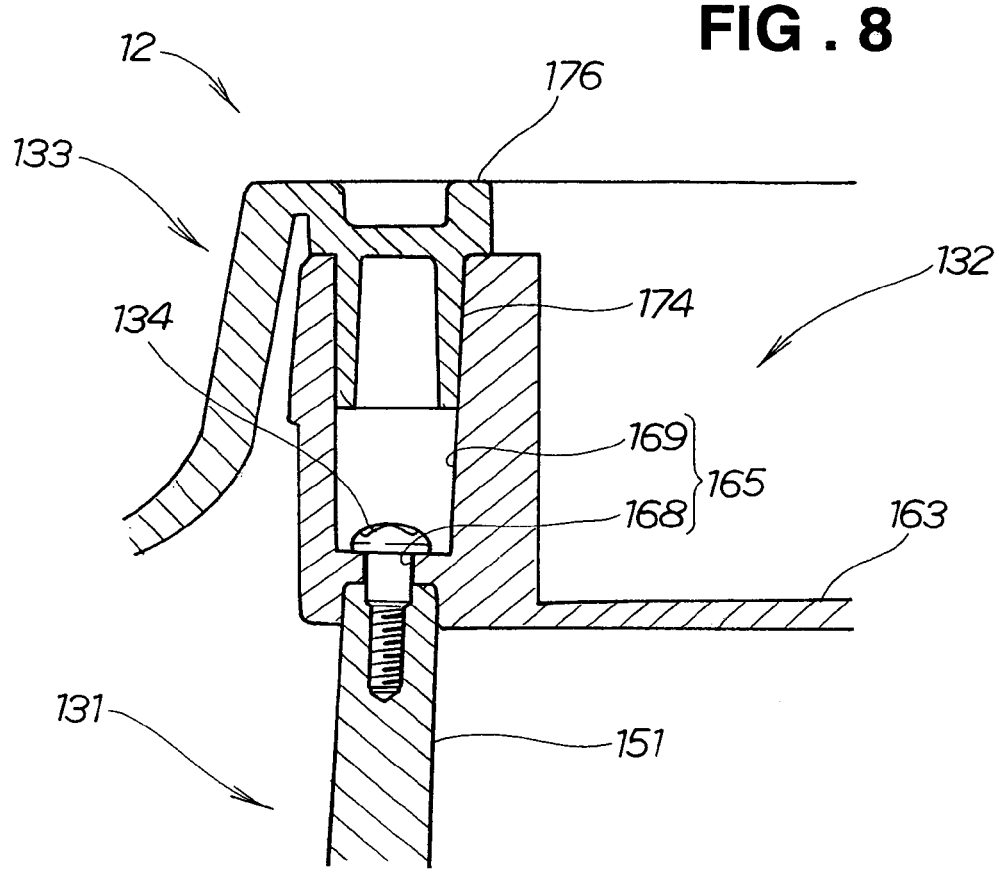
FIG. 8 is a sectional view on the line 8-8 in FIG. 7.

As shown in FIG. 8, the inner mounting part 165 of the bottom member 132 has a through hole 168 for a fixing screw 134 to pass through and a mating tubular part 169 for the boss part 174 of the scroll guide member 133 to mate with.

As a result of the entrance-side reinforced part 163 of the bottom member 132 being fixed to the housing proper 131 and the boss part 174 of the scroll guide member 133 being mated with the mating tubular part 169, the ease of assembly of the bottom member 132 and the scroll guide member 133 improves.

Figure 9:
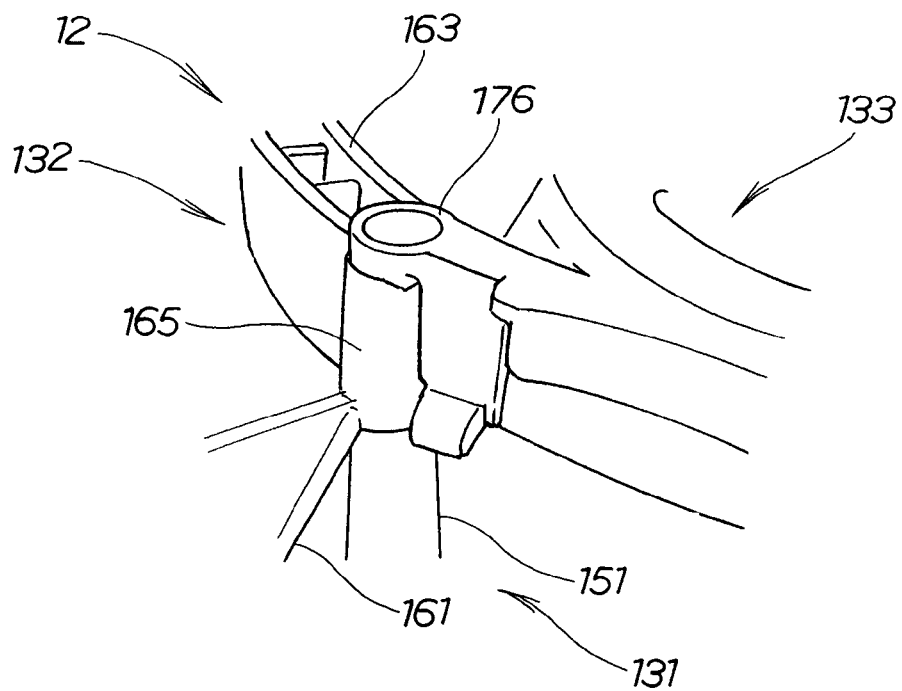
FIG. 9 is a view in the direction of the arrow 9 in FIG. 7.

As shown in FIG. 9, by the inner mounting part 165 of the bottom member 132 being fixed to the inner mounting boss 151 of the housing proper 131 and the boss part 174 of the scroll guide member 133 being fitted (press-fitted) into the mating tubular part 169 (see FIG. 8) of this inner mounting part 165, the two members that are the bottom member 132 and the scroll guide member 133 can be supported on the one inner mounting boss 151. Also, the entrance-side reinforced part 163 of the bottom member 132 and the scroll guide member 133 are assembled in a continuous circular arc shape so as to allow rotation of the cutter blade 14 (see FIG. 4).

An assembly procedure of the cutter housing 12 described above will now be described, on the basis of FIG. 10A to FIG. 10F.

Figure 10A:
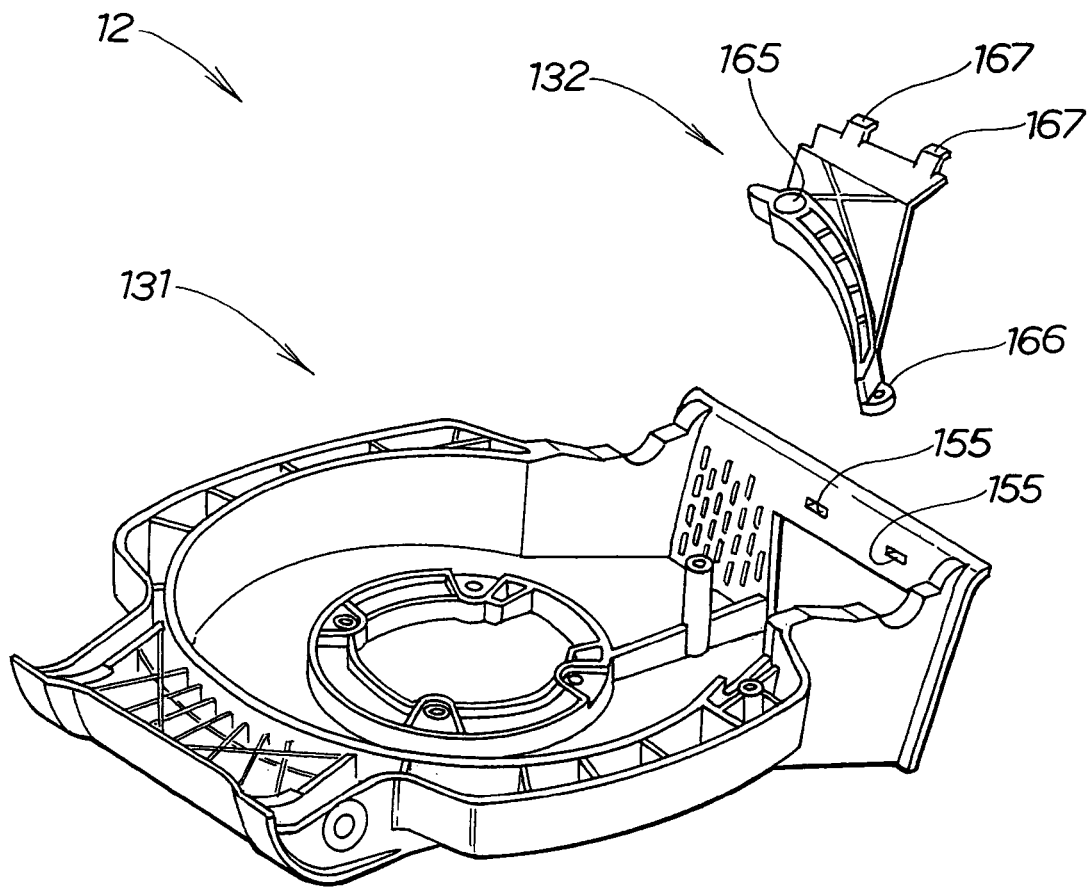
FIG. 10A to FIG. 10F are perspective views showing an assembly procedure of a cutter housing according to the invention.

As shown in FIG. 10A, the housing proper 131 is set in an upside-down state, and the bottom member 132 is brought preparatorily to above the housing proper 131.

Figure 10B:
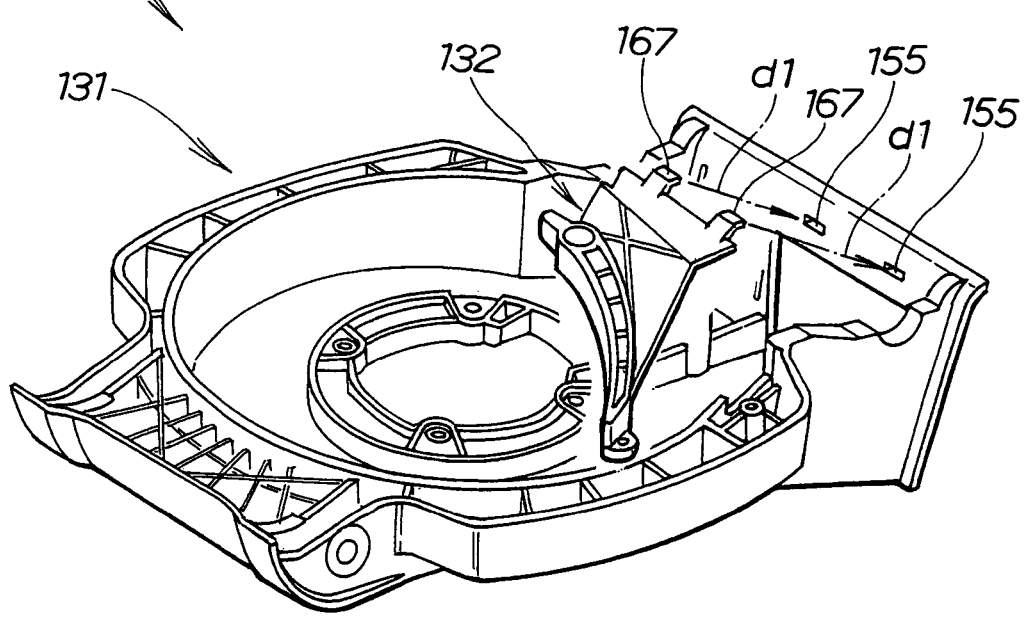

As shown in FIG. 10B, the projections 167, 167 of the bottom member 132 are inserted into the engaging holes 155, 155 in the housing proper 131 as shown by the arrows d1, d1.

Figure 10C:
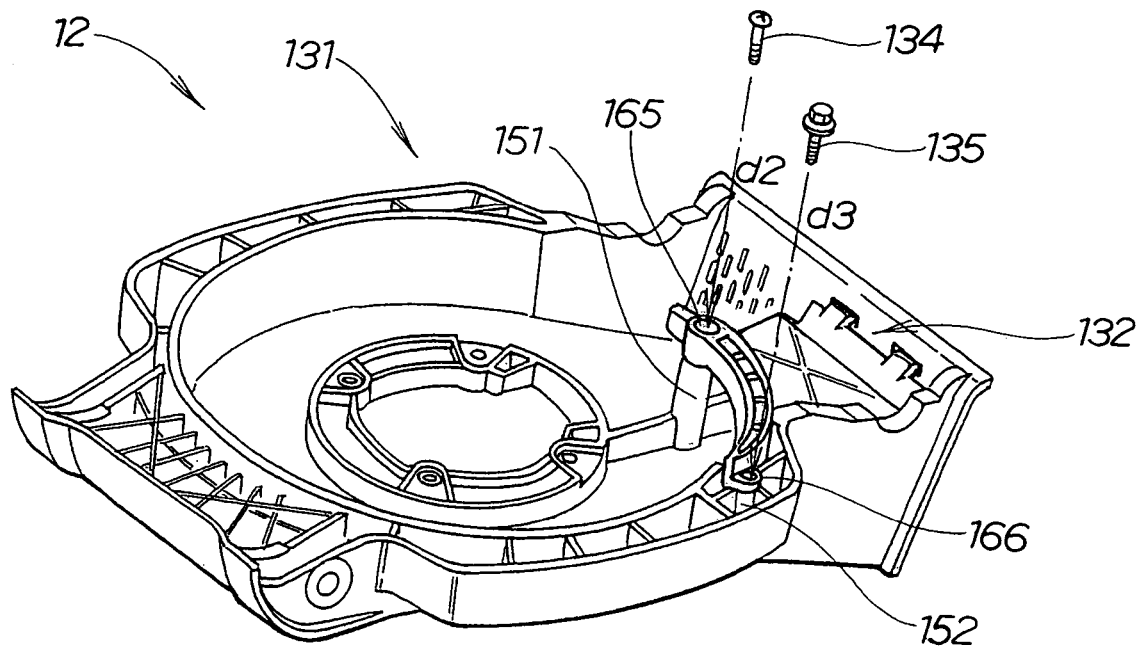

In FIG. 10C, the inner mounting part 165 of the bottom member 132 is set on the inner mounting boss 151 of the housing proper 131 and the outer mounting part 166 of the bottom member 132 is set on the outer mounting boss 152 of the housing proper 131. Then, the fixing screw 134 is passed through the inner mounting part 165 and screwed into the inner mounting boss 151 of the fixing screw 134 as shown by the arrow d2 and the fixing screw 135 is passed through the outer mounting part 166 and screwed into the outer mounting boss 152 as shown by the arrow d3 and the bottom member 132 is thereby fixed to the housing proper 131.

Figure 10D:
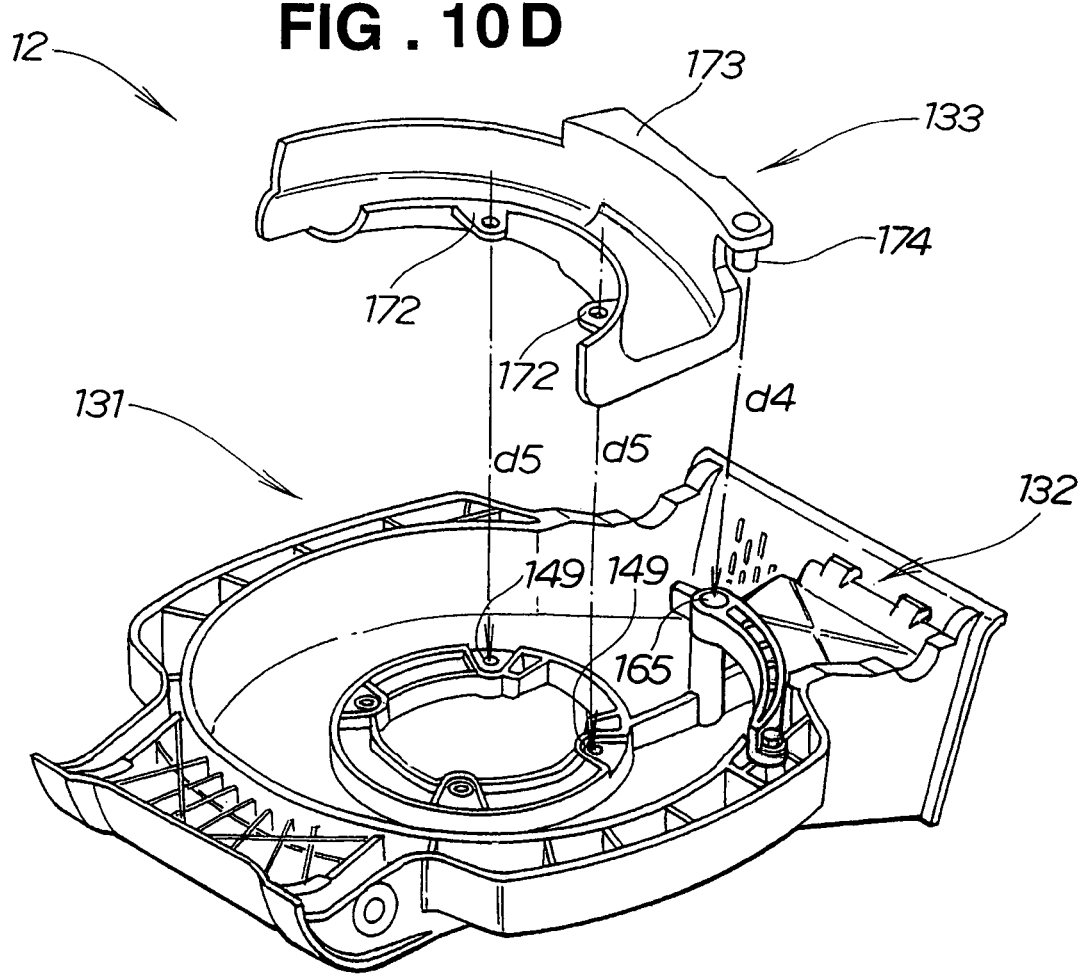

In FIG. 10D, the boss part 174 of the scroll guide member 133 is fitted (press-fitted) into the inner mounting part 165 of the bottom member 132 as shown by the arrow d4, and the co-fastening parts 172, 172 of the scroll guide member 133 are set on the fixing holes 149, 149 of the housing proper 131 as shown by the arrows d5, d5.

Figure 10E:
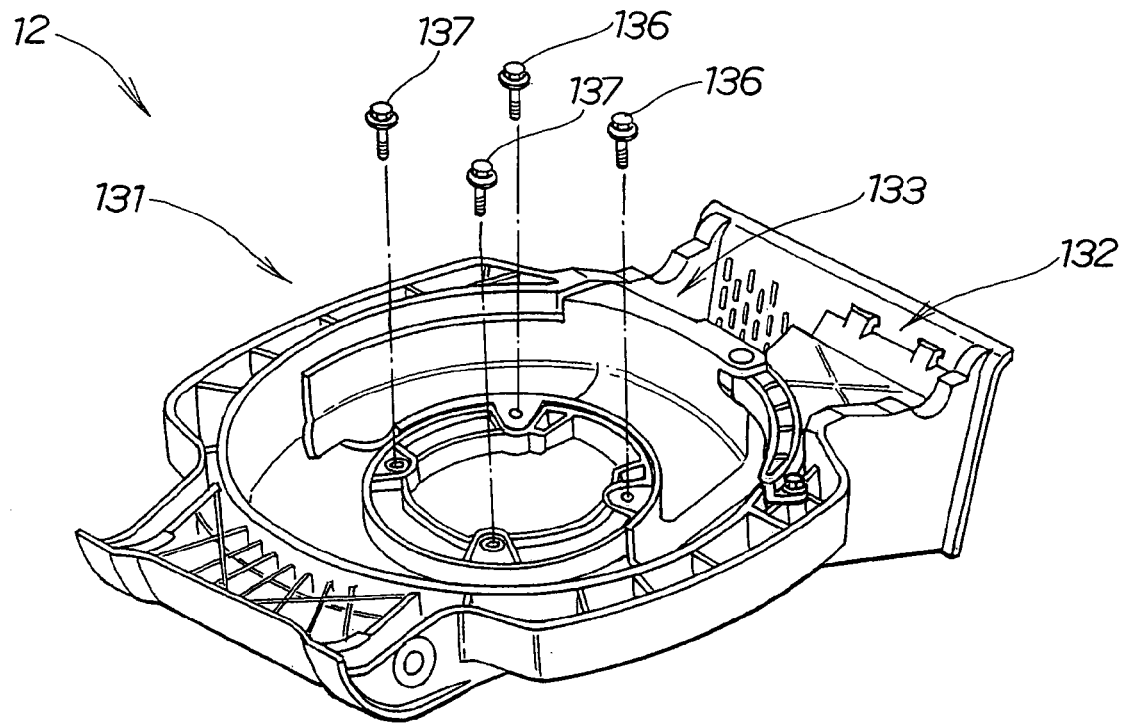

In FIG. 10E, the engine 13 (see FIG. 2) is made ready and the fixing screws 136, 136 for co-fastening the scroll guide member 133 to the housing proper 131 together with the engine 13 are made ready. The fixing screws 137, 137 for fixing the engine 13 to the housing proper 131 are also made ready.

Figure 10F:
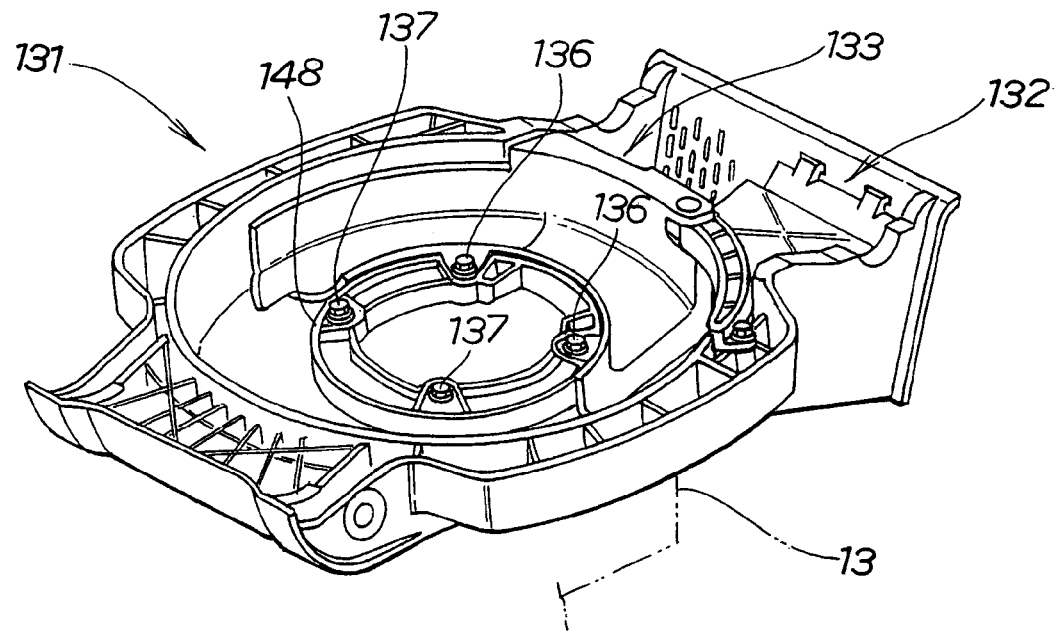
Figure 11:
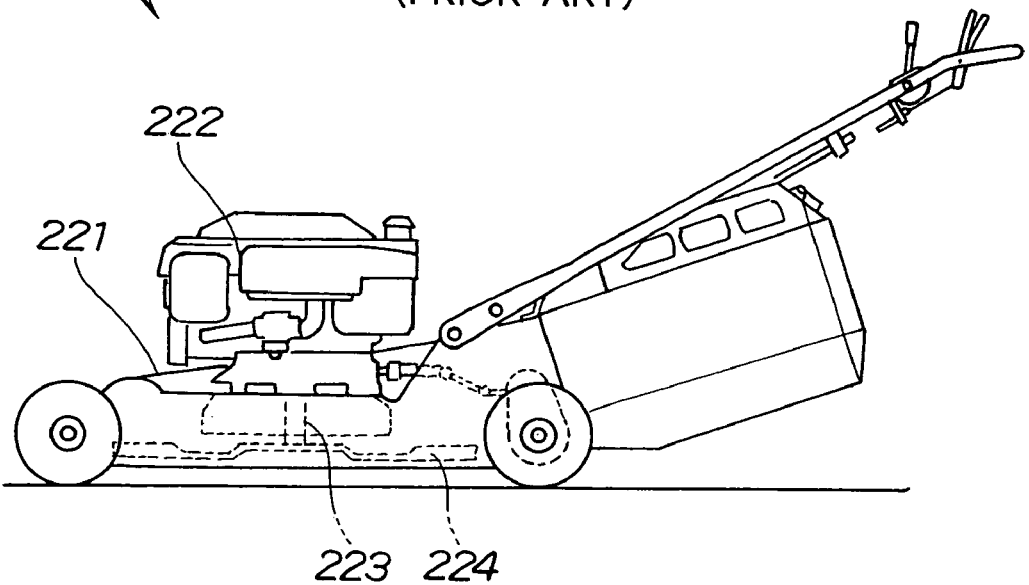
FIG. 11 is a side view showing a lawn mower of related art.
Figure 12:
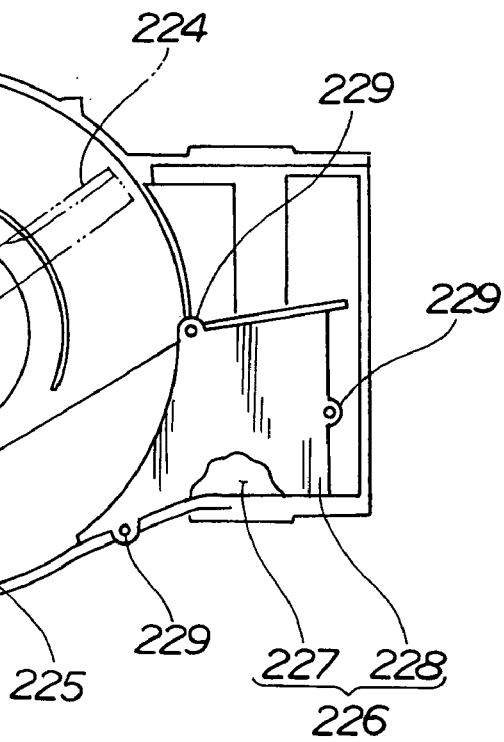
FIG. 12 is bottom view of a cutter housing shown in FIG. 11.

As shown in FIG. 10F, the engine 13 is placed on the engine mount part 148 of the housing proper 131 and the fixing screws 136, 136 and the fixing screws 137, 137 are screwed into the engine 13 from the inner side of the housing proper 131, whereby the engine 13 is fixed to the housing proper 131. As a result, the scroll guide member 133 is also fixed to the housing proper 131.

That is, by the scroll guide member 133 being co-fastened together with the housing proper 131 and the engine 13, it is possible to keep down the number of fixing screws. As a result, the assembly time of the cutter housing 12 can be shortened.

Whereas the lawn mower of this preferred embodiment has been described using an example in which the boss part 174 of the scroll guide member 133 is fitted (press-fitted) to the inner mounting part 165 of the bottom member 132 as shown in FIG. 6, the invention is not limited to this, and alternatively for example the inner mounting part 165 and the boss part 174 may be co-fastened to the inner mounting boss 151 with the fixing screw 134.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower comprising:
   a motive power source;
   a cutter blade for cutting grass, rotated by the motive power source; and
   a cutter housing, for receiving the cutter blade, having a scroll part for guiding cut grass into a cut grass carrying passage,
   wherein the cutter housing comprises a housing main body for receiving the cutter blade, a bottom member fixed to the housing main body and forming between an underside of the housing main body and an upper side of the bottom member the cut grass carrying passage, and a scroll guide member fixed to the housing main body and forming therewith the scroll part, and
   a cut grass carrying passage exit side of the bottom member is engaged with the housing main body and a cut grass carrying passage entrance side of the bottom member is fixed to the housing main body and engages with the scroll guide member, and
   the scroll guide member is co-fastened by fasteners to both the housing main body and the motive power source.

2. A lawn mower comprising: a cutter housing comprised of a housing main body having an arcuate sidewall that terminates at a rear end thereof in a rear wall and having a top wall connected to the sidewall and the rear wall to jointly define therewith a housing concavity, a scroll guide member disposed in the housing concavity, and a bottom member disposed in the housing concavity and extending forwardly from the rear wall and spaced below the top wall to define with the top wall a cut grass passage for conveying cut grass from the housing concavity through an exit opening in the rear wall; a motive power source disposed on an outer side of the cutter housing and connected to rotationally drive a cutter blade located within the housing concavity; first fasteners fastening the bottom member to the housing main body; and second fasteners fastening the scroll guide member to both the housing main body and the motive power source.

3. A lawn mower according to claim 2; wherein each of the second fasteners fastens the scroll guide member to both the housing main body and the motive power source.

4. A lawn mower according to claim 2; wherein the bottom member has an opening, and the scroll guide member has a protuberance press-fitted in the opening.

5. A lawn mower according to claim 4; wherein one of the first fasteners is located at the bottom of the opening beneath the protuberance.

6. A lawn mower according to claim 2; wherein the rear wall has engaging holes, and the bottom member has projections engageable in respective ones of the engaging holes.

7. A lawn mower according to claim 2; wherein each of the housing main body, scroll guide member and bottom member comprises a molded structure.

8. A lawn mower according to claim 2; wherein a rear part of the bottom member engages with the rear wall of the housing main body and a front part of the bottom member engages with the scroll guide member.

9. A lawn mower according to claim 8; wherein the bottom member has an opening, and the scroll guide member has a protuberance press-fitted in the opening.

10. A lawn mower according to claim 9; wherein the rear wall has engaging holes, and the bottom member has projections engageable in respective ones of the engaging holes.

11. A lawn mower according to claim 8; wherein the rear wall has engaging holes, and the bottom member has projections engageable in respective ones of the engaging holes.

12. A lawn mower according to claim 8; wherein each of the housing main body, scroll guide member and bottom member comprises a molded structure.

* * * * *